(12) United States Patent
Nishimura et al.

(10) Patent No.: US 7,406,541 B2
(45) Date of Patent: Jul. 29, 2008

(54) ACCOUNTING METHOD AND SYSTEM IN A PACKET COMMUNICATION NETWORK

(75) Inventors: Katsunori Nishimura, Tokyo (JP); Tsukasa Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 1153 days.

(21) Appl. No.: 10/179,026

(22) Filed: Jun. 26, 2002

(65) Prior Publication Data
US 2003/0002500 A1 Jan. 2, 2003

(30) Foreign Application Priority Data
Jun. 26, 2001 (JP) ............................. 2001-193023

(51) Int. Cl.
*G06F 15/16* (2006.01)
(52) U.S. Cl. ........................... 709/242; 705/30
(58) Field of Classification Search ................ 709/238, 709/242, 201
See application file for complete search history.

(56) References Cited

U.S. PATENT DOCUMENTS

| | | | |
|---|---|---|---|
| 5,406,555 A | | 4/1995 | Yoshida |
| 5,602,907 A | * | 2/1997 | Hata et al. ............. 379/114.22 |
| 5,623,405 A | | 4/1997 | Isono |
| 5,729,740 A | * | 3/1998 | Tsumura ................. 707/104.1 |
| 5,930,772 A | * | 7/1999 | Gomyo et al. ................ 705/30 |
| 6,405,251 B1 | * | 6/2002 | Bullard et al. .............. 709/224 |
| 6,615,260 B1 | | 9/2003 | Honda et al. |
| 6,738,752 B2 | | 5/2004 | Sako et al. |
| 6,775,519 B1 | * | 8/2004 | Wiedeman et al. ......... 455/12.1 |

FOREIGN PATENT DOCUMENTS

| | | |
|---|---|---|
| EP | 1026853 | 8/2000 |
| EP | 1126733 | 8/2001 |
| GB | 2371180 | 7/2002 |
| JP | 63-290042 | 11/1988 |
| JP | 2-166942 | 6/1990 |
| JP | 4-288746 | 10/1992 |
| JP | 5-030132 | 2/1993 |
| JP | 5-75649 | 3/1993 |
| JP | 06-104922 | 4/1994 |
| JP | 6-164578 | 6/1994 |
| JP | 6-205050 | 7/1994 |
| JP | 6-237316 | 8/1994 |
| JP | 7-131557 | 5/1995 |
| JP | 7-245627 | 9/1995 |

(Continued)

*Primary Examiner*—Rupal Dharia
*Assistant Examiner*—Bradford F. Fritz
(74) *Attorney, Agent, or Firm*—Foley & Lardner LLP

(57) ABSTRACT

In an accounting system, an user 1, by the use of a terminal 2, transmits a transmission packet P1 to a reception destination 3, that is a server of an information service provider, and receives a reception packet P2 therefrom by way of a packet communication network 4. The accounting apparatus 6 receives numbers of transmitted and received packets 51 from an exchange 5 and also receives the accounting amendment information 71 from the accounting amendment apparatus 7 at an adequate timing. The accounting apparatus 6 thereby decides the account fees for the user 1 of the terminal 2 and for the reception destination 3, respectively. In other words, the information service provider is charged with a part of the numbers of transmitted and received packets 51.

4 Claims, 4 Drawing Sheets

FOREIGN PATENT DOCUMENTS

| | | |
|---|---|---|
| JP | 9-107420 | 4/1997 |
| JP | 11-27322 | 1/1999 |
| JP | 11-355355 | 12/1999 |
| JP | 2000-78129 | 3/2000 |
| JP | 2000-78196 | 3/2000 |
| JP | 2000-078555 | 3/2000 |
| JP | 2000-101573 | 4/2000 |
| JP | 2000-209200 | 7/2000 |
| KR | 2002-0018991 | 3/2002 |

* cited by examiner

FIG. 3 (A)

| SOURCE ADDRESS OF INFORMATION PROVISION | PROTOCOL | ACCOUNT FEE | ACCOUNT UNIT |
|---|---|---|---|
| ...... | ...... | ...... | ... |
| ...... | ...... | ...... | ... |
| ...... | ...... | ...... | ... |

| SOURCE ADDRESS OF INFORMATION PROVISION | KIND OF INFORMATION | ACCOUNT FEE | ACCOUNT UNIT |
|---|---|---|---|
| ...... | ...... | ...... | ... |
| ...... | ...... | ...... | ... |
| ...... | ...... | ...... | ... |

| SOURCE ADDRESS OF INFORMATION PROVISION | NAME OF FILE | ACCOUNT FEE | ACCOUNT UNIT |
|---|---|---|---|
| ...... | ...... | ...... | ... |
| ...... | ...... | ...... | ... |
| ...... | ...... | ...... | ... |

41, 42, 43, 44

ACCOUNTING METHOD AND SYSTEM IN A PACKET COMMUNICATION NETWORK

BACKGROUND OF THE INVENTION

The present invention relates to a packet communication, in particular to an accounting method and an accounting system in a network in which information is distributed by packets between an information service provider and a plurality of portable terminals (or information terminals).

Portable terminals (or portable telephones) have rapidly come into wide use due to their convenience. Under the present conditions, the portable terminals (or the portable telephones) have exceeded fixed telephone terminals in number. Particularly, a portable terminal is used as communication means merely by voice communication between the portable terminals. In addition, a portable terminal is connected to a personal computer (PC), and. the like, so that the portable terminal is used as a data communication terminal with the other personal computers, and the like. Furthermore, a portable terminal (i-mode) having a function for being connected to an Internet is also used as an information terminal for carrying out an information search, or the like. Thus, it is a recent trend that the portable terminal (or portable information terminal) has high performance and multi-functions. Thereby, the portable terminals (or portable information terminals) have come into wide use, as mentioned above.

In a case of a general telephone terminal (telephone set), the general telephone terminal (telephone set) is fixed at a home or at an office. Therefore, a transmitting place and a receiving place are decided by the fixed telephone terminal (telephone set). In an accounting method for accounting a user with use fee, the use fee will be decided dependent on a region where a telephone terminal of a communication partner is existing (whether the telephone terminal of the communication partner is within the city, out of the city, or in a foreign country), on a time of talking with the communication partner, and so on. On the contrary, in a case of a portable terminal, a transmitting place moves as the owner of the portable terminal moves. It is therefore impossible to apply the portable terminal with an accounting method similar to that of the above-mentioned general telephone terminal. Particularly, in a case that a portable terminal, such as the i-mode, and the like is connected to an Internet (is subjected to an Internet access) by using a packet communication, a specific accounting method is generally used. Namely, in the specific accounting method, a user of the portable terminal pays the use fee responsive to numbers of transmitted and received packets from the portable telephone.

On the other hand, in Web review focusing on the use by a dial-up connection from a PC, a use of an Internet, such as transmission and reception of an electronic mail (e-mail), or the like, provision of various new services, such as distribution of graphic image, distribution of music by MP2 (multi-link protocol), program download by JAVA, and the like, have been started. In particular the amount of data downloaded to the portable terminal of the user side is greatly increased, as compared with conventional services focusing on transmission and reception of text data.

Conventional techniques in such a technical field or related fields are disclosed in, for example, unexamined Japanese patent publication 2000-78129, named "accounting method of information communication network", unexamined Japanese patent publication 2000-78196, named "IP network accounting system", unexamined Japanese patent publication Sho 63-290042, named "accounting system in a packet exchanging network", unexamined Japanese patent publication Hei 2-166942, named "count system of a packet communication fee", unexamined Japanese patent publication Hei 4-288746, named "communication right or wrong judging system in a communication between various kinds of packet exchanging systems", unexamined Japanese patent publication Hei 5-75649, named "accounted amount calculating apparatus of a packet communication network", unexamined Japanese patent publication Hei 6-164578, named "data terminal equipment", unexamined Japanese patent publication Hei 6-205050, named "multi-destination processing method of a connecting apparatus for connecting LAN with broad band ISDN", unexamined Japanese patent publication Hei 6-237316, named "ISDN communication processing apparatus", unexamined Japanese patent publication Hei 7-131557, named "accounting system in information communication", unexamined Japanese patent publication Hei 7-245627, named "packet measuring apparatus", unexamined Japanese patent publication Hei 9-107420, named "detailed account processing method in a communication processing system", unexamined Japanese patent publication Hei 11-27322, named "data receiving apparatus and data receiving method", unexamined Japanese patent publication Hei 11-355355, named "distribution information registering method in a mobile communication network", and the like.

FIG. 1 shows a typical example of an accounting system in a conventional packet communication network. In the conventional accounting system a user 1 of a terminal (for example, a portable terminal) 2 communicates with a reception destination 3, that is, a server apparatus of an information service provider, by way of a packet communication network 4. The packet communication network 4 has an exchange 5 to which an accounting apparatus 6 is connected. When the user 1 of the terminal 2 sends a transmission packet P1, the exchange 5 of the packet communication network 4 makes the transmission packet P1 be received by the reception destination 3. In addition, a packet that is an information from the reception destination 3 is sent to the terminal 2, as a reception packet P2, by way of the packet communication network 4. The exchange 5 of the packet communication network 4 then transmits numbers of packets 51 transmitted and received by the user 1 to the accounting apparatus 6 at an adequate timing. Consequently, the accounting apparatus 6 calculates the account for the user 1 based on the numbers of packets 51.

However, the conventional accounting system in the packet communication network has the following problems. Namely, if the specific accounting method for the use of an Internet by the dial-up connection from PC is applied, as it stands, to the Internet by using packets, an amount of accounts to be paid by the user accessing the Internet using packets becomes at least ten times as large as that in the use of an Internet by the dial-up connection from PC. This is too heavy a burden for the user. This is also a problem with regard to applying new techniques, such as distribution of graphic images to the Internet that is accessed by using the packet communication from the portable terminal, such as the i-mode, and the like, similarly to the use of the Internet by the dial-up connection from PC.

Further, for contents providers (information service providers) who use the Internet and wish to put advertisements widely by Web or e-mails, their free actions are inevitably restricted under the system that the user of the portable terminal bears all of the communication fees.

SUMMARY OF THE INVENTION

It is therefore an object of the present invention to provide accounting method and apparatus in a packet communication network which are capable of solving the above-mentioned problems or releasing the burden of the users and which enable the information service provides to provide new services.

Other objects of the present invention will become clear as the description proceeds.

According to an aspect of the present invention, there is provided an accounting method for use in accounting information distribution in a packet communication network that information is distributed by a packet between a server of an information service provider and a plurality of terminals of users by way of the packet communication network, the accounting method comprising the steps of:

amending a specific accounting by numbers of transmitted and received packets in the packet communication network with accounting amendment information based on the distributed information; and thereby deciding the account for the information service provider and the users.

The accounting amendment information may be determined based on a kind, a use, and a protocol of the distributed information.

According to another aspect of the present invention, there is also provided an accounting system for use in accounting information distribution in a packet communication network that information is distributed by a packet between a server of an information service provider and a plurality of terminals of users by way of the packet communication network, the accounting system comprising:

accounting amendment apparatus which outputs accounting amendment information dependent on a kind or a use of the distributed information; and an accounting apparatus for deciding the account for the information distribution, the accounting apparatus deciding an account for the information service provider and the users based on the accounting amendment information and numbers of transmitted and received packets from an exchange of the packet communication network.

The accounting amendment apparatus may be located in the exchange of the packet communication network.

The accounting amendment apparatus may comprise a database for accounting unit and fee per each source of information distribution, each kind of the information, each use of the information, and each protocol, the accounting system amending a specific accounting for numbers of transmitted and received packets with the accounting amendment information.

The accounting system may recognize a kind of information by an extension of a file included in the distributed information while the accounting system may recognize a use of information by a name of the file.

A plurality of terminals may be a plurality of portable terminals.

BRIEF DESCRIPTION OF THE DRAWINGS

FIGS. 3(A) through 3(C) are diagrams for schematically showing examples of the database illustrated in FIG. 2, (A) shows a protocol accounting database schema, (B) shows an accounting database schema per kind of information, (C) shows an accounting database schema per use of information.

DETAILED DESCRIPTION OF THE PREFERRED EMBODIMENTS

Figure 2:
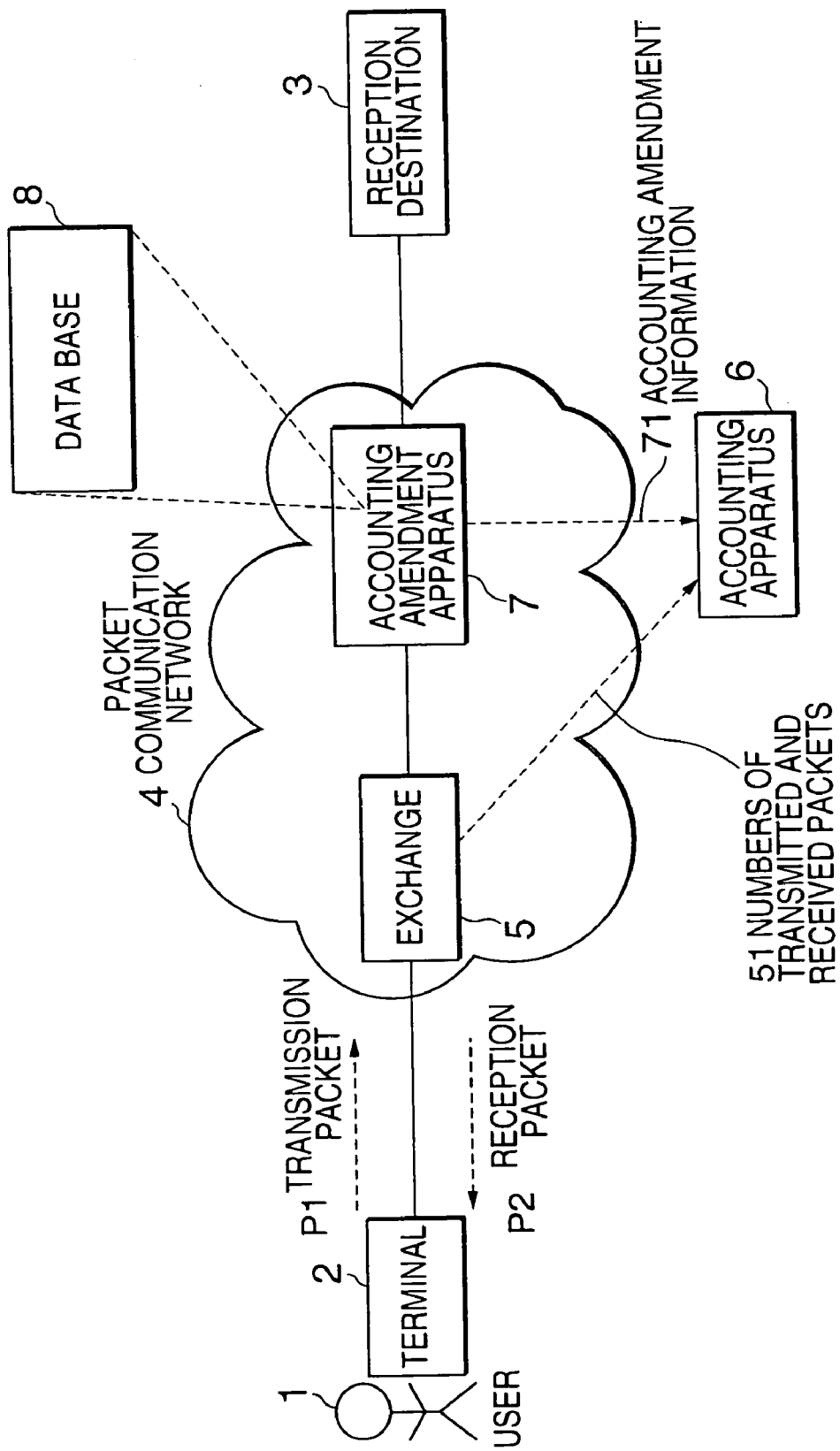
FIG. 2 is a block diagram for schematically showing an accounting system in a packet communication network according to a first embodiment of the present invention.
Figure 4:
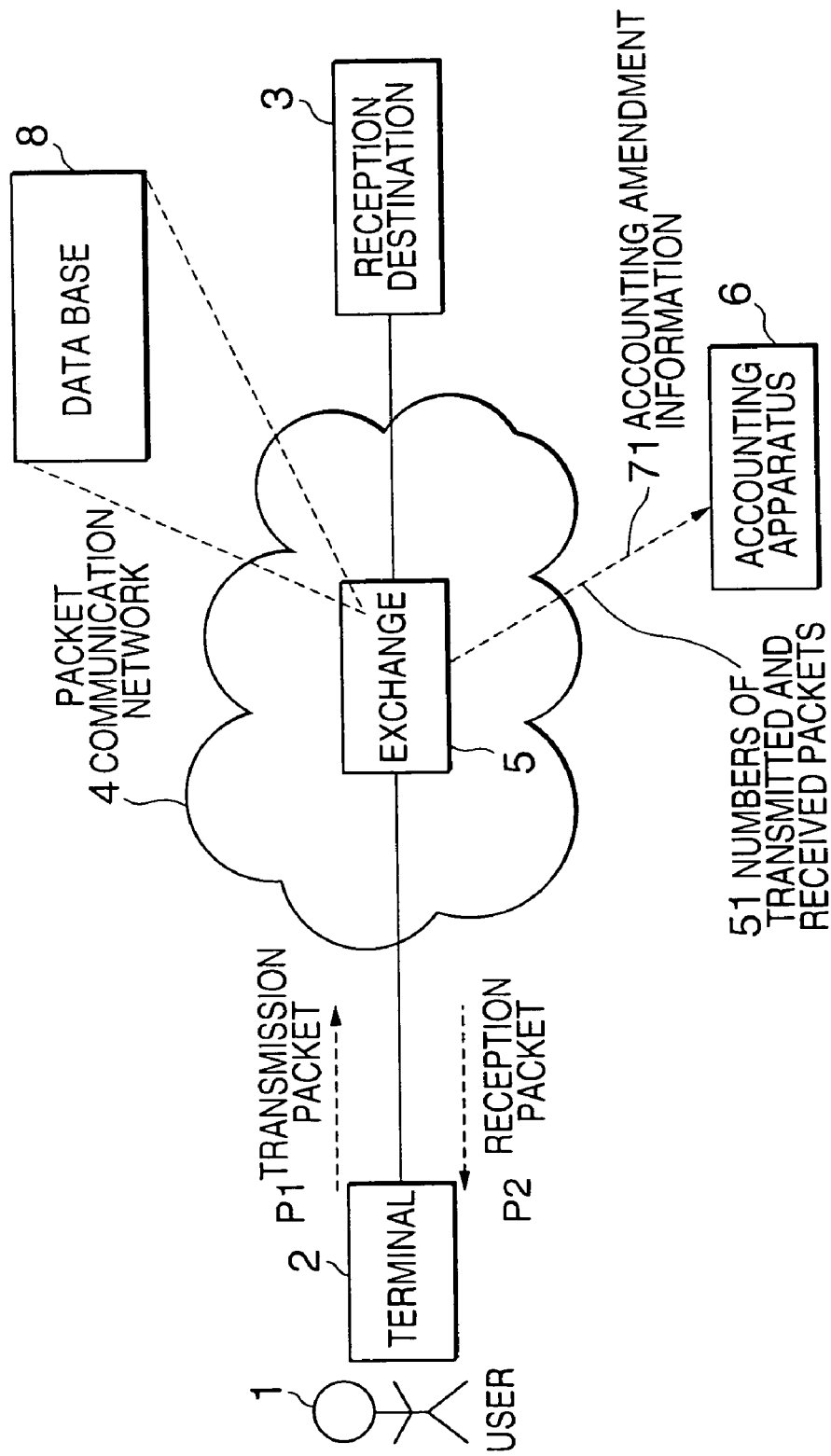
FIG. 4 is a block diagram for schematically showing an accounting system in a packet communication network according to a second embodiment of the present invention.

Referring to FIGS. 2 through 4, description will proceed to an accounting method and system in a packet communication network according to preferred embodiments of the present invention.

Figure 1:
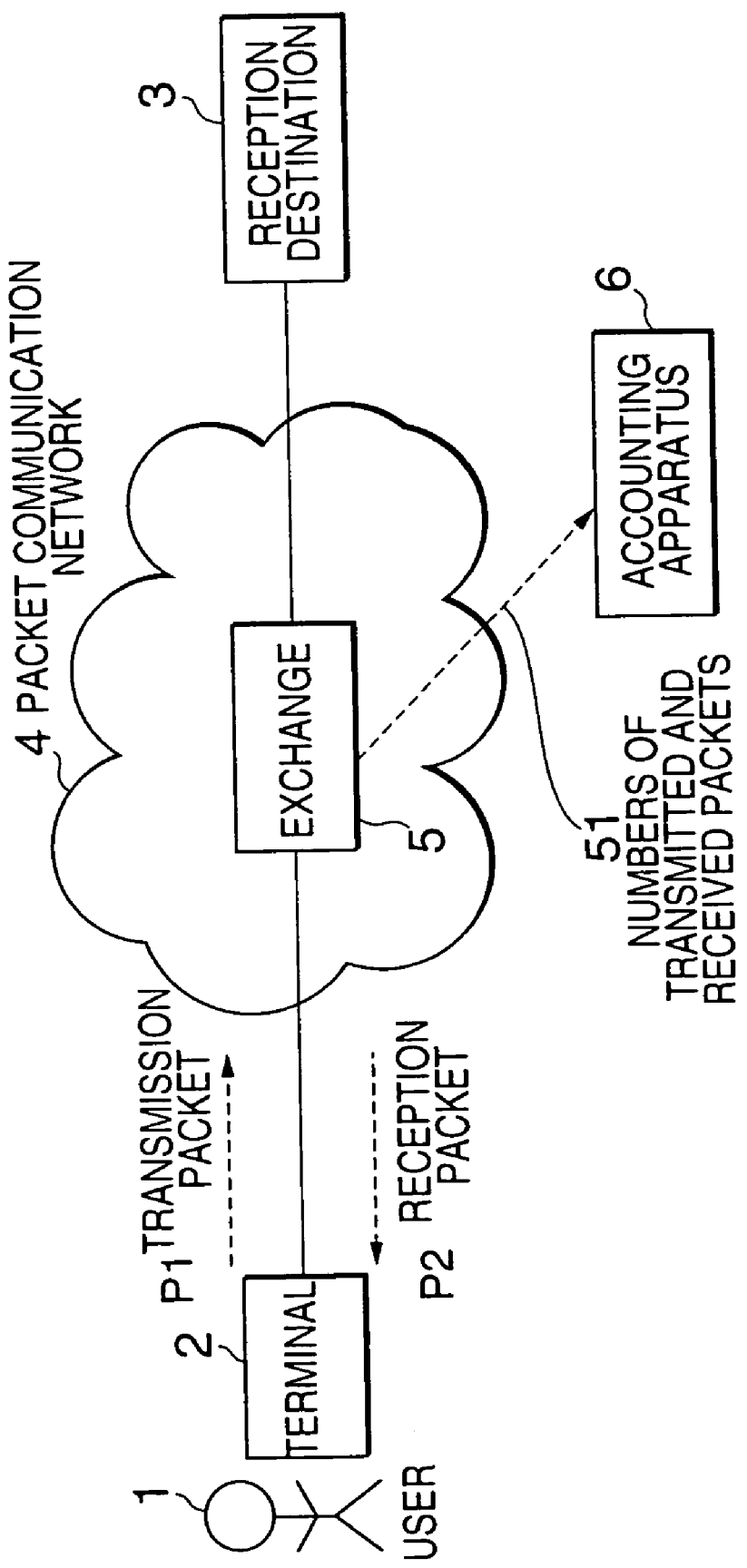
FIG. 1 is a block diagram for schematically showing a conventional specific accounting system in a packet communication network.

At first, FIG. 2 is a block diagram for schematically showing a constitution of the accounting system in the packet communication network according to a first embodiment of the present invention. The accounting system illustrated in FIG. 2 has portions similar to those of the conventional accounting system in the packet communication network illustrated in FIG. 1. The similar portions are designated by like reference numerals for brevity of description. Namely, as illustrated in FIG. 2, the accounting system in the packet communication network according to the first embodiment of the present invention comprises a terminal (for example, a portable terminal) 2, a reception destination 3, that is, a server apparatus of an information service provider, a packet communication network 4, an exchange 5, and an accounting apparatus 6. In addition, the accounting system further comprises an accounting amendment apparatus 7 which includes a database 8.

In the accounting system illustrated in FIG. 2, a user 1 of the terminal 2 sends the transmission packet P1 to the packet communication network 4 and receives, on the contrary, the reception packet P2 from the packet communication network 4. The exchange 5 of the packet communication network 4 then transmits numbers of packets 51 transmitted and received by the terminal 2 to the accounting apparatus 6 at an adequate timing. Further, accounting amendment information 71 is sent from the accounting amendment apparatus 7 to the accounting apparatus 6. Consequently, the accounting apparatus 6 calculates use fees of the user 1 of the terminal 2 and the reception destination 3, which is an information service provider (contents provider) based on the numbers of transmitted and received packets 51 and the accounting amendment information 71. The accounting apparatus 6 then charges the user 1 and the reception destination 3 for the use fees.

The accounting system in the packet communication network according to this embodiment utilizes an identifier indicating a kind of information, such as music, and the like, which is to be obtained by the user 1 in the packet communication network 4 and a use of information, such as an advertisement, or the like. Based on the kind of information and the use of information, the use fees for accounting are decided. Further, the use fees for accounting can also be decided based on a kind of protocol of information distribution. For example, the use fees for accounting can be decided dependent on whether the information is distributed by way of an electronic mail or Web. This enables the information service provider to provide, for example, the following new services. Namely, the contents provider is charged for a graphic image used for an advertisement on Web (advertisement). Further, the contents provider is charged with a part of unrequested music data to provide only the part of the unrequested music data, as a sample to users. Furthermore, the contents provider is charged with packet fees for direct mails by the use of electronic mails.

The accounting system in the packet communication network according to the first embodiment of the present invention, as depicted in FIG. 2, is not confined to a method of accounting by calculating only the numbers of transmitted and received packets sent from the exchange 5. Namely, the accounting system in the packet communication network according to the first embodiment of the present invention further comprises the accounting amendment apparatus 7 which includes the database 8 having source address of information provision, kinds of information, an accounting unit and a fee per each kind of information. The accounting amendment apparatus 7 investigates information included in the transmission packet P1 and the reception packet P2 with reference to the database 8 to output the accounting amendment information 71. In addition, the database 8 has an accounting unit and a fee per each name of a file. The accounting amendment apparatus 7 thereby decides the fee dependent on a use of the file. Moreover, the database 8 has an accounting unit and a fee per each protocol. The accounting amendment apparatus 7 is thereby capable of deciding the fee dependent on the protocol. As a result, the accounting system in the packet communication network according to the first embodiment of the present invention amends the conventional accounting information by the numbers of transmitted and received packets 51 by the use of the accounting amendment information 71 outputted from the accounting amendment apparatus 7, so that the accounting system acquires new (amended) accounting information. Accordingly, the accounting system calculates fees for the user 1 based on the new (amended) accounting information.

Hereunder, further detailed description is made about the constitution of the accounting system in the packet communication network according to the first embodiment of the present invention. As illustrated in FIG. 2, the accounting system in the packet communication network according to the first embodiment has the accounting amendment apparatus 7 in addition to the conventional constitution illustrated in FIG. 1 having a specific accounting apparatus. The accounting amendment apparatus 7 includes the database 8 which stores an accounting unit and a fee per each kind of information, use of information, and a protocol of information. FIGS. 3(A) through 3(C) shows schemas of the database 8.

The database 8 illustrated in FIG. 3(A) includes source addresses of information provisions 21, protocols 22, account fees 23, and account units 24. The source addresses of information provisions 21 store, for example, mail addresses, such as "yyy@xxx.co.jp", "xxx.co.jp/zzz", and the like, and certain addresses capable of identifying the source of information provision, such as a name of a server as well as a name of directory, or the like. The protocols 22 store names of protocols, such as "http", "smtp", and the like. The account fees 23 store amendment fees, such as "-0.1 yen", "+0.2 yen", and the like each corresponding to each protocol 22. The account units 24 store units of the account fees 23, such as "one packet", and the like.

Further, the database 8 illustrated in FIG. 3(B) includes source addresses of information provisions 31, kinds of information 32, account fees 33, and account units 34. The source addresses of information provisions 31 store, similarly to those of the database 8 illustrated in FIG. 3(A), mail addresses, such as "yyy@xxx.co.jp", "xxx.co.jp/zzz", and the like, and certain addresses capable of identifying the source of information provision, such as a name of a server as well as a name of directory, or the like. The kinds of information 32 store extensions showing kinds of the files, such as "gif", "exe", and the like The account fees 33 store amendment fees, such as "-0.1 yen", "+0.2 yen", and the like each corresponding to each kind of information 32. The account units 34 store units of the account fees 33, such as "one packet", and the like.

Furthermore, the database 8 illustrated in FIG. 3(C) includes source addresses of information provisions 41, names of files 42, account fees 43, and account units 44. The source addresses of information provisions 41 store, similarly to those of the database 8 illustrated in FIG. 3(A) or 3(B), mail addresses, such as "yyy@xxx.co.jp", "xxx.co.jp/zzz", and the like, and certain addresses capable of identifying the source of information provision, such as a name of a server as well as a name of directory, or the like. The names of files 42 store certain names of files, such as "xxx.gif", "yyy.exe", and the like. The account fees 43 store amendment fees, such as "-0.1 yen", "+0.2 yen", and the like each corresponding to each name of a file 42. The account units 44 store units of the account fees 43, such as "one packet", and the like.

Next, referring to FIGS. 2 and 3A-3C, description will proceed to operations of the accounting method and system in the packet communication network according to the first embodiment of the present invention. At first, using the terminal 2, the user I receives the reception packet P2 from the reception destination 3 by way of the packet communication network 4. The exchange 5 of the packet communication network 4 calculates numbers of packets of the reception packet P2 and then transmits the numbers of transmitted and received packets 51 to the accounting apparatus 6 at an adequate timing.

Further, the accounting amendment apparatus 7 acquires a protocol, a source address of the information provision, and a name of a file from information included in the reception packet P2. In addition, the accounting amendment apparatus 7 also acquires a kind of the file by an extension of the file. On the other hand, the accounting amendment apparatus 7 acquires the account fees 23 and the account units 24 per each protocol from the database 8 based on the source addresses of information provisions 21 and the protocols 22. Next, the accounting amendment apparatus 7 acquires the account fees 33 and the account units 34 per each kind of information from the database 8 based on the source addresses of information provisions 31 and the kinds of information 32. Further, the accounting amendment apparatus 7 acquires the account fees 43 and the account units 44 per each use of information from the database 8 based on the source addresses of information provisions 41 and the names of files 42 The accounting amendment apparatus 7 then transmits the acquired account fees 23, 33, 43 and account units 24, 34, 44 to the accounting apparatus 6 as the accounting amendment information 71. As a result, the accounting apparatus 6 carries out calculation of fees based on the numbers of transmitted and received packets 51 and the accounting amendment information 71. The accounting apparatus 6 thereby decides the fee for the user 1 and the fee for the reception destination 3 that is a source of the information provision.

Next, referring to FIG. 4, description will proceed to an accounting system in a packet communication network according to a second embodiment of the present invention. The accounting system in the packet communication network according to the second embodiment of the present invention is also not confined to a method of accounting by calculating only the numbers of transmitted and received packets, similarly to that of the first embodiment. However, in the second embodiment, as depicted in FIG. 4, the exchange 5 includes the database 8 having source addresses of information provisions, kinds of information, accounting units and fees per each kind of information. The exchange 5 has a function to investigate information included in the transmission packet P1 and the reception packet P2 with reference to the database 8 to output the accounting amendment information 71. As a result, the user 1 is charged with a fee based on a new accounting information in which a conventional accounting information only by the numbers of transmitted and received packets 51 is amended by the accounting amendment information 71.

As illustrated in FIG. 4, the accounting system in the packet communication network according to the second embodiment of the present invention comprises a terminal (for example, a portable terminal) 2, a reception destination (contents provider) 3, a packet communication network 4, the exchange 5 within the packet communication network 4, and the accounting apparatus 6 connected to the exchange 5. The exchange 5 includes the database 8 and thereby carries out the processing carried out by the accounting amendment apparatus 7 in the first embodiment. Accordingly, the exchange 5 transmits not only the numbers of transmitted and received packets 51 but also the accounting amendment information 71 to the accounting apparatus 6. As a result, meritorious effects similar to those of the first embodiment can be obtained by the second embodiment.

As described, above, according to the accounting method and system of the present invention, remarkably advantageous effects in actual use can be obtained as follows. Namely, a fee for accounting can be decided per each kind of information, such as a music file obtained by a user of the packet communication network, and the like, each use of information, such as an advertisement, or the like, and each protocol. As a result, accounting suitable for contents of the information can be achieved. In other words, accounting for a part or whole of certain information can be imposed not only on a user of a portable terminal but also on an information service provider (contents provider), which is a reception destination. In order to achieve these effects, in the accounting method and, system of the present invention, merely the accounting amendment apparatus is added and an accounting apparatus (information) is amended by the accounting amendment information of the accounting amendment apparatus. The effects can therefore be achieved readily and at a low cost.

While this invention has thus far been described in conjunction with several embodiments thereof, it will now be readily possible for one skilled in the art to put this invention into effect in various other manners. For example, the terminal 2 is a portable terminal in the first and the second embodiments. However, the present invention is not restricted to a portable terminal. Namely, the terminal may be a general (fixed) terminal alternatively.

What is claimed is:

1. An accounting method for use in accounting information distribution in a packet communication network in which information is distributed by packets between a server of an information service provider and a plurality of terminals of users by way of the packet communication network, said accounting method comprising the steps of:

amending a specific accounting of numbers of transmitted and received packets in said packet communication network with accounting amendment information based on the distributed information; and deciding an account to be charged to said information service provider and to said users, based on the amended specific accounting;

determining whether any unsolicited advertisements are included in the number of transmitted and received packets, and counting a number of packets corresponding to the unsolicited advertisements; and deciding an account for a supplier of the unsolicited advertisements based on at least a protocol used in the packets corresponding to the unsolicited advertisements, wherein said accounting amendment information is determined based on a combination of a kind, a use, and a protocol of said distributed information.

2. An accounting system for use in accounting information distribution in a packet communication network in which information is distributed by packets between a server of an information service provider and a plurality of terminals of users by way of the packet communication network, said accounting system comprising:

accounting amendment apparatus which outputs accounting amendment information dependent on a kind or a use of the distributed information; and an accounting apparatus for deciding the account for said information distribution, said accounting apparatus deciding an account for said information service provider and said users based on said accounting amendment information and numbers of transmitted and received packets from an exchange of said packet communication network, wherein said accounting system recognizes a kind of information by an extension of a file included in said distributed information while said accounting system recognizes a use of information by a name of said file.

3. An accounting system as claimed in claim 2, wherein said a plurality of terminals are a plurality of portable terminals.

4. An accounting method for use in accounting information distribution in a packet communication network in which information is distributed by packets between a server of an information service provider and a plurality of terminals of users by way of the packet communication network, said accounting method comprising the steps of:

amending a specific accounting of numbers of transmitted and received packets in said packet communication network with accounting amendment information based on the distributed information; and deciding an account to be charged to said information service provider and to said users, based on the amended specific accounting, wherein, in a case in which music data is requested from the information service provider by one of the plurality of terminals of users, the method further comprising:

determining whether packets of data sent from the information service provider to the one of the plurality of users are requested music data or sample music data not requested by the one of the plurality of users, and if so, counting a number of such packets; and deciding the account be charged to said information service provider and to the one of the plurality of users, based on a specific fee to be charged only to said information service provider and not to said one of the plurality of user for the number of packets corresponding to the sample music data not requested by the one of the plurality of users.

* * * * *